United States Patent
Sarkar et al.

(10) Patent No.: US 11,127,401 B2
(45) Date of Patent: Sep. 21, 2021

(54) ATTENTION SHIFTING OF A ROBOT IN A GROUP CONVERSATION USING AUDIO-VISUAL PERCEPTION BASED SPEAKER LOCALIZATION

(71) Applicant: Tata Consultancy Services Limited, Mumbai (IN)

(72) Inventors: Chayan Sarkar, Kolkata (IN); Hrishav Bakul Barua, Kolkata (IN); Arpan Pal, Kolkata (IN); Balamuralidhar Purushothaman, Bangalore (IN); Achanna Anil Kumar, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 16/936,118

(22) Filed: Jul. 22, 2020

(65) Prior Publication Data

US 2021/0097995 A1 Apr. 1, 2021

(30) Foreign Application Priority Data

Sep. 27, 2019 (IN) .............................. 201921039326

(51) Int. Cl.
*G10L 15/22* (2006.01)
*G05D 3/20* (2006.01)
(Continued)

(52) U.S. Cl.
CPC ................ *G10L 15/22* (2013.01); *G05D 3/20* (2013.01); *G06K 9/00248* (2013.01);
(Continued)

(58) Field of Classification Search
CPC ....... G10L 15/22; G10L 15/063; G10L 15/25; G10L 25/78; G10L 2015/0635;
(Continued)

(56) References Cited

U.S. PATENT DOCUMENTS 9,311,527 B1 * 4/2016 Yin ........................... G06T 7/73
2018/0374494 A1 * 12/2018 Yamaya ............. G06K 9/00523
(Continued)

FOREIGN PATENT DOCUMENTS

| CN | 105116994 | | 12/2015 |
| CN | 105929827 | A | 9/2016 |
| CN | 106203259 | A | 12/2016 |

OTHER PUBLICATIONS

D. Gala et al., Realtime Active Sound Source Localization for Unmanned Ground Robots Using a Self-Rotational Bi-Microphone Array, Journal of Intelligent & Robotic Systems, Aug. 3, 2018, pp. 935-954, Springer Nature Switzerland, https://arxiv.org/pdf/1804.03372.pdf.

(Continued)

*Primary Examiner* — Mohammad K Islam
(74) *Attorney, Agent, or Firm* — Finnegan, Henderson, Farabow, Garrett & Dunner, LLP (57) ABSTRACT

This disclosure relates to attention shifting of a robot in a group conversation with two or more attendees, wherein at least one of them is a speaker. State of the art has dealt with several aspects of Human-Robot Interaction (HRI) including responding to a source of sound at a time, addressing a fixed viewing area or determining who is the speaker based on eye gaze direction. However, attention shifting to make the conversation human-like is a challenge. The present disclosure uses audio-visual perception for speaker localization. Only qualified direction of arrivals (DOAs) are used for the audio perception. Further the audio perception is complimented by visual perception employing real time face detection and lip movement detection. Use of HRI rules, clustering of the DOAs, dynamic adjustment of rotation of the robot and a dynamically updated knowledge repository (Continued)

enriches the robot with intelligence to shift attention with minimum human intervention.

16 Claims, 6 Drawing Sheets

(51) Int. Cl.
| | | |
|---|---|---|
| G06K 9/00 | (2006.01) | |
| G10L 15/06 | (2013.01) | |
| G10L 15/25 | (2013.01) | |
| G10L 25/78 | (2013.01) | |
| H04R 1/40 | (2006.01) | |
| H04R 3/00 | (2006.01) | |

(52) U.S. Cl.
CPC ........ *G06K 9/00281* (2013.01); *G10L 15/063* (2013.01); *G10L 15/25* (2013.01); *G10L 25/78* (2013.01); *H04R 1/406* (2013.01); *H04R 3/005* (2013.01); *G10L 2015/0635* (2013.01)

(58) Field of Classification Search
CPC .. G05D 3/20; G06K 9/00248; G06K 9/00281; H04R 1/406; H04R 3/005
See application file for complete search history.

(56) References Cited

U.S. PATENT DOCUMENTS

| | | | |
|---|---|---|---|
| 2019/0025400 A1* | 1/2019 | Venalainen | H04R 3/005 |
| 2019/0206400 A1* | 7/2019 | Cui | G05D 1/0231 |
| 2020/0225344 A1* | 7/2020 | Yoon | G01H 3/125 |

OTHER PUBLICATIONS

Zhao Li et al., Multiple Active Speaker Localization based on Audio-visual Fusion in two Stages, 2012 IEEE International Conference on Multisensor Fusion and Integration for Intelligent Systems (MFI), Sep. 13-15, 2012, IEEE, https://ieeexplore.ieee.org/abstract/document/6343015/authors#authors.

* cited by examiner

ATTENTION SHIFTING OF A ROBOT IN A GROUP CONVERSATION USING AUDIO-VISUAL PERCEPTION BASED SPEAKER LOCALIZATION

PRIORITY CLAIM

This U.S. patent application claims priority under 35 U.S.C. § 119 to: Indian Patent Application No. 201921039326, filed on 27 Sep. 2019. The entire contents of the aforementioned application are incorporated herein by reference.

TECHNICAL FIELD

The disclosure herein generally relates to Human-Robot Interaction, and, more particularly, to attention shifting of a robot in a group conversation using audio-visual perception based speaker localization.

BACKGROUND

Human-Robot Interaction (HRI) has become an indispensable part of today's Robotics research and applications which involves humans interacting with machines and the urge for humans to have a more human-like experience. Some areas where HRI can influence include search and rescue, assistive robotics, military and police, edutainment, space explorations, home and industry. Robots have to play various roles in HRI sessions. Some widely identified roles a robot may play are supervisor, operator, mechanic, peer, bystander, mentor and information consumer. For such roles, a robot's interaction with humans is a necessary element for successfully attaining a goal. Humans need to understand what a robot is up to and a robot is required to understand what a human is indicating or saying. A robot cannot perceive as a human. Hence making an interaction with humans as human-like as possible is a challenge.

SUMMARY

Embodiments of the present disclosure present technological improvements as solutions to one or more of the above-mentioned technical problems recognized by the inventors in conventional systems.

In an aspect, there is provided a processor implemented method for shifting attention of a robot characterized by a state representation model, in a group conversation with two or more attendees with at least one of the two or more attendees being a speaker, the method comprising the steps of: estimating, via one or more hardware processors comprised in the state representation model, direction of arrivals (DOAs) of voice activity captured continuously via a microphone array, through sound source localization (SSL) for the robot to respond in real-time, wherein the DOAs are triggered by Voice Activity Detection (VAD) and are estimated based on Time Difference of Arrival (TDOA) associated with the captured voice activity; dynamically qualifying, via the one or more hardware processors, the estimated DOAs to obtain a list of qualified DOAs, thereby enabling audio perception for the robot; generating, via the one or more hardware processors, a set of clusters of qualified DOAs from the list thereof, based on angular distances therebetween; dynamically associating, via the one or more hardware processors, each of the qualified DOAs with one of the two or more attendees thereby identifying a current position of each of the two or more attendees; continually updating, via the one or more hardware processors, a knowledge repository comprising the qualified DOAs, the generated set of clusters and the current position of each of the two or more attendees; and dynamically rotating the robot, via the one or more hardware processors, such that attention of the robot is shifted to at least one of the attendees being a speaker by enabling visual perception for the robot based on a computed angle of rotation using one or more Human-Robot Interaction (HRI) rules and the continually updated knowledge repository.

In another aspect, there is provided a system for shifting attention of a robot in a group conversation with two or more attendees with at least one of the two or more attendees being a speaker, the system being characterized by a state representation model comprising: one or more data storage devices operatively coupled to one or more hardware processors and configured to store instructions configured for execution via the one or more hardware processors to: estimate direction of arrivals (DOAs) of voice activity captured continuously via a microphone array characterized by at least 2 microphones, through sound source localization (SSL) for the robot to respond in real-time, wherein the DOAs are triggered by Voice Activity Detection (VAD) and are estimated based on Time Difference of Arrival (TDOA) associated with the captured voice activity; dynamically qualify the estimated DOAs to obtain a list of qualified DOAs, thereby enabling audio perception for the robot; generate a set of clusters of qualified DOAs from the list thereof, based on angular distances therebetween; dynamically associate each of the qualified DOAs with one of the two or more attendees thereby identifying a current position of each of the two or more attendees; continually update a knowledge repository comprising the qualified DOAs, the generated set of clusters and the current position of each of the two or more attendees; and dynamically rotate the robot such that attention of the robot is shifted to at least one of the attendees being a speaker by enabling visual perception for the robot based on a computed angle of rotation using one or more Human-Robot Interaction (HRI) rules and the continually updated knowledge repository.

In yet another aspect, there is provided a computer program product comprising a non-transitory computer readable medium having a computer readable program embodied therein, wherein the computer readable program, when executed on a computing device, causes the computing device to: estimate direction of arrivals (DOAs) of voice activity captured continuously via a microphone array characterized by at least 2 microphones, through sound source localization (SSL) for the robot to respond in real-time, wherein the DOAs are triggered by Voice Activity Detection (VAD) and are estimated based on Time Difference of Arrival (TDOA) associated with the captured voice activity; dynamically qualify the estimated DOAs to obtain a list of qualified DOAs, thereby enabling audio perception for the robot; generate a set of clusters of the qualified DOAs based on angular distances therebetween; dynamically associate each of the qualified DOAs with one of the two or more attendees thereby identifying a current position of each of the two or more attendees; continually update a knowledge repository comprising the qualified DOAs, the generated set of clusters and the current position of each of the two or more attendees; and dynamically rotate the robot such that attention of the robot is shifted to at least one of the attendees being a speaker by enabling visual perception for the robot based on a computed angle of rotation using one or more Human-Robot Interaction (HRI) rules and the continually updated knowledge repository.

In accordance with an embodiment of the present disclosure, the one or more processors are further configured to estimate DOAs of voice activity by validating the voice activity captured for estimation of the DOAs based on sampling of the voice activity at an empirically determined frequency until the voice activity is characterized by an empirically determined decibel value for an empirically determined number of continuous samples being a first threshold.

In accordance with an embodiment of the present disclosure, the one or more processors are further configured to dynamically qualify the estimated DOAs to obtain a list of qualified DOAs comprises: computing a difference between a current estimated DOA and a previous estimated DOA; on identifying a first qualified DOA, appending the current estimated DOA to the list of qualified DOAs and setting a timeout instant being a sum of a current time and an empirically determined second threshold, if the computed difference is greater than an empirically determined third threshold; and generating the set of clusters of the qualified DOAs, if the list of qualified DOAs is not empty and the current time is greater than the timeout instant, else continue capturing the voice activity.

In accordance with an embodiment of the present disclosure, the one or more processors are further configured to generate a set of clusters of qualified DOAs by: identifying a first qualified DOA as a first cluster of the set of clusters; dynamically assigning each of the qualified DOAs to the first cluster or to a new cluster as part of the set of clusters depending on the angular distance of the qualified DOAs from a center associated with each cluster in the set of clusters, wherein the center is an average DOA of an associated cluster; and updating the average DOA associated with each cluster in the set of clusters after every assignment of the qualified DOAs to a cluster in the set of clusters to generate a new center for each cluster in the set of clusters for further assigning of the qualified DOAs to a cluster.

In accordance with an embodiment of the present disclosure, the one or more processors are further configured to assign an estimated DOA to a cluster if the angular distance between the estimated DOA and the center of a cluster from the set of clusters is less than an empirically determined fourth threshold and also lesser than the angular distance between the other clusters in the set of clusters.

In accordance with an embodiment of the present disclosure, the one or more processors are further configured to dynamically rotate the robot such that attention of the robot is shifted to at least one of the attendees by: computing an initial angle of rotation for the robot based on the audio perception using the qualified DOAs, wherein the robot initiates rotation either towards the center of a cluster to which each of the qualified DOAs belong or towards the qualified DOAs if it is not part of any cluster from the set of clusters and forms a new cluster therewithin; performing real time face detection from a continuous video feed via a camera to detect one or more faces associated with the qualified DOAs; and rotating the robot by performing one of: modifying the initial angle of rotation such that a detected face is in the middle of the viewing area of the robot based on boundary pixels of a box surrounding the detected face, if only one face is detected; and performing lip movement detection to identify a speaker if more than one face is detected and modifying the initial angle of rotation or adjusting viewing angle of the camera such that the detected face of the identified speaker is in the middle of the viewing area of the robot.

In accordance with an embodiment of the present disclosure, the HRI rules comprise: 1) rotate only if there if there is a time interval of more than 2 seconds between two consecutive DOA estimations; 2) rotate to a neutral location if the time interval between two consecutive DOA estimations is less than 2 seconds; 3) rotate only if the angular difference between two consecutive DOA estimations is greater than 5 seconds; and 4) rotate to the average DOA of a particular cluster if the voice activity captured is associated with the particular cluster.

In accordance with an embodiment of the present disclosure, the one or more processors are further configured to: validate the dynamic rotation of the robot based on the continually updated knowledge repository by validating the set of clusters of the qualified DOAs and the current position of each of the two or more attendees; and update the HRI rules based on a plurality of feedbacks received from the one or more attendees confirming a positive experience with the attention shifting performed by the robot.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Robots are gradually becoming a prominent part of our day-to-day life. Many applications have been realized in industrial as well as personal platforms, such as warehouse automation robots, personal guide robots, telepresence robots, teacher robots, and the like. Out of these, telepresence is one of the most prominent use-case that finds application in real-world scenarios such as the corporate, government, medical world, and the like. A typical use-case is that of a robot attending a meeting on behalf of a human if he is unable to be present in the meeting himself. The robot then needs to be controlled from remote with minimum effort. One of the most critical aspects to make the interaction of the robot with the humans effective is to have the robot address the speaker/audience directly.

Sound Source Localization (SSL) techniques have been employed in the art for Human Robot Interaction (HRI). For instance, Rascon, C et al. in '*Integration of the multi-DOA estimation functionality to human-robot interaction*' has discussed a hotel scenario where a robot is replacing a waiter on duty. The robot turns towards a customer while taking orders but announces its inability to detect speaker direction due to multiple speakers speaking at a time or ambient noises. Some work have discussed how humans feel well about a robot belonging to a group considering gaze, orientation and motion of the robot.

Multi-modal audio-visual systems for speaker detection and localization have been employed in the art. Bennewitz, M et al. in '*Towards a humanoid museum guide robot that interacts with multiple persons*' has in 2005 discussed a multi-modal HRI system for a humanoid robot that makes use of visual perception. The robot can use hand and eye gestures to direct the attention of the communicating person towards displayed items. However, when there are multiple speakers, each one is assigned an importance value and attention is always on the person with maximum importance value. The calculation of attention value gives preference to a person closer to the robot. If a person who is at a distance or is out of view of the robot starts speaking, attention is not shifted immediately (until the person achieves highest importance). Reaction time is low and there is a possibility of missing some voice activity in a group conversation scenario.

Stoll et al. in an *HRI'18* conference has presented a study directed at telepresence robotics. They experimented with a collaborative task to solve a word puzzle where two collocated attendees team up with a remote attendee using a telepresence robot. The observation was that the collocated attendees tend to interact with other collocated attendees more than they do with a remote attendee. The main reason was lack of ease of interaction among the collocated attendees and remote attendees through the robot. Recent works lack in viewing accuracy due to limited viewing area, lack of face to face interaction, lack of eye gazes, gestures, body movement, attention shifting strategy, and body language. In a nutshell, there is a lack of feeling of belongingness in the remote attendee or participant about his/her presence in the actual location and same feeling goes for the collocated attendees/participants in the actual location about the remote participant.

Gina Venolia, et al. in *SIGCHI Conference on 'Human Factors in Computing Systems*' have discussed work on their telepresence device (Embodied Social Proxy) to enable a satellite co-worker to be present in the meetings with the collocated co-workers to improve interpersonal connection socially. Since the device was not mobile, limited features were available. A video conferencing system with multiple camera feed was used to enable multiple views of the meeting proceedings coming through each camera feed to a remote attendee. In this case, the remote attendee can also see multiple split screens on his/her display. This may not provide a human like view for attention shifting to an active speaker.

The present disclosure has addressed this issue by designing the HRI setup in a mobile manner. Jacob T. Biehl et al. in the 18th ACM conference on '*Computer supported cooperative work social computing*' has discussed the adverse effects of using Embodied Social Proxy devices and how such a device tends to confuse speakers and there is no clarity on when to speak. This happens due to lack of sense of presence and belongingness for the remote attendee. The present disclosure addresses this issue by enabling audio-visual perception thereby increasing the perception of the robot and a sense of presence and belongingness for the remote attendee. The viewing angle and area has been improved by shifting attention on the visual input as and when required.

Though standard video conferencing systems are widely used to attend telepresence meetings remotely, the camera in such a system is adjusted to a certain viewing angle (maximum 150°-180°). This provides a video feed of a fixed area to the remote participant. This also results in limited capturing of the activities happening in the meeting. Moreover, the camera has to be adjusted accordingly. Although there are some video-conferencing systems equipped with cameras which can rotate or adjust themselves as per need but robust rotation strategies are not in place. Such cameras also lack flexibility issues as they are fixed onto some objects such as table or platform. Therefore, to provide the entire proceedings of the meeting to the remote participant, either the activities have to be restricted within the limited viewing area or the camera has to be adjusted. On the other hand, if a robot is capable enough to understand the meeting environment and detect the speakers and activities of the speakers using audio-video perception, then it provides an added advantage with little human intervention. The basic requirement here is to identify different speakers in a meeting scenario and adjust the robot's pose to bring focus on the current speaker. Although https://www.doublerobotics.com presented a video conferencing environment with eye gaze perceiving robot, it can only determine whom to look or who is going to speak on the basis of other attendees' eye gaze direction. But it would be a challenge to accurately replicate a remote person's behavior in this scenario.

In light of the prior art, shifting attention of the robot to one or more speakers effectively is the technical problem addressed in this disclosure. Particularly, a telepresence application has been considered and the disclosure is focused on ease of remote participation and collocated attendees' perception of the robot and remote attendee. However, the systems and methods of the present disclosure may be extended to other HRI applications. Again, the current disclosure may be applied to scenarios where the attendees are collocated or at least in a scenario where there is one remote attendee per screen, each having a separate sound source. The robot of the present disclosure is characterized by a state representation model described herein after.

Referring now to the drawings, and more particularly to FIGS. 1 through 5, where similar reference characters denote corresponding features consistently throughout the figures, there are shown preferred embodiments and these embodiments are described in the context of the following exemplary system and/or method.

In the context of the present disclosure, the expressions 'attendee', 'participant', 'speaker', 'humans' may be used interchangeably. It may be noted that at least one of the 'attendee' or 'participant' may be a speaker. It may also be noted that once the robot develops sufficient intelligence as explained hereinafter, the methods and systems of the present disclosure may be extended to a group interaction involving a plurality of robots and human attendees. Again, the expressions 'conversation' and 'interaction' may be used interchangeably hereinafter in the context of the present disclosure.

Figure 1:
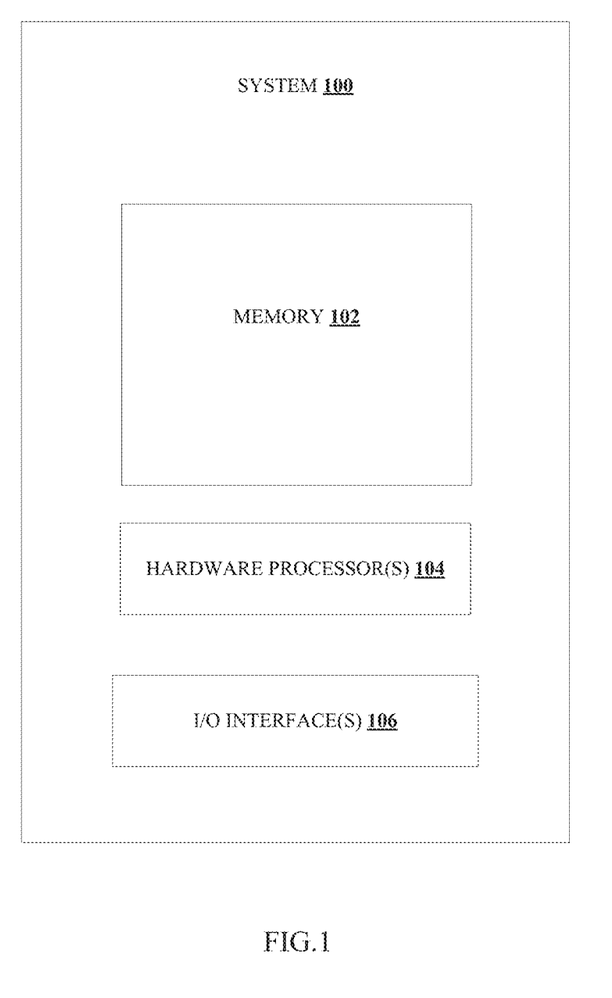
FIG. 1 illustrates an exemplary block diagram of a system for attention shifting of a robot in a group conversation using audio-visual perception based speaker localization, in accordance with some embodiments of the present disclosure.

FIG. 1 illustrates an exemplary block diagram of a system for attention shifting of a robot in a group conversation using audio-visual perception based speaker localization, in accordance with some embodiments of the present disclosure. In an embodiment, the system 100 is characterized by the state representation model and includes one or more processors 104, communication interface device(s) or input/output (I/O) interface(s) 106, and one or more data storage devices or memory 102 operatively coupled to the one or more processors 104. The one or more processors 104 that are hardware processors can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In the context of the present disclosure, the expressions 'processors' and 'hardware processors' may be used interchangeably. In an embodiment, the system 100 can be implemented in a variety of computing systems, such as laptop computers, notebooks, hand-held devices, workstations, mainframe computers, servers, a network cloud and the like.

I/O interface(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system 100 can be stored in the memory 102.

Figure 2A:
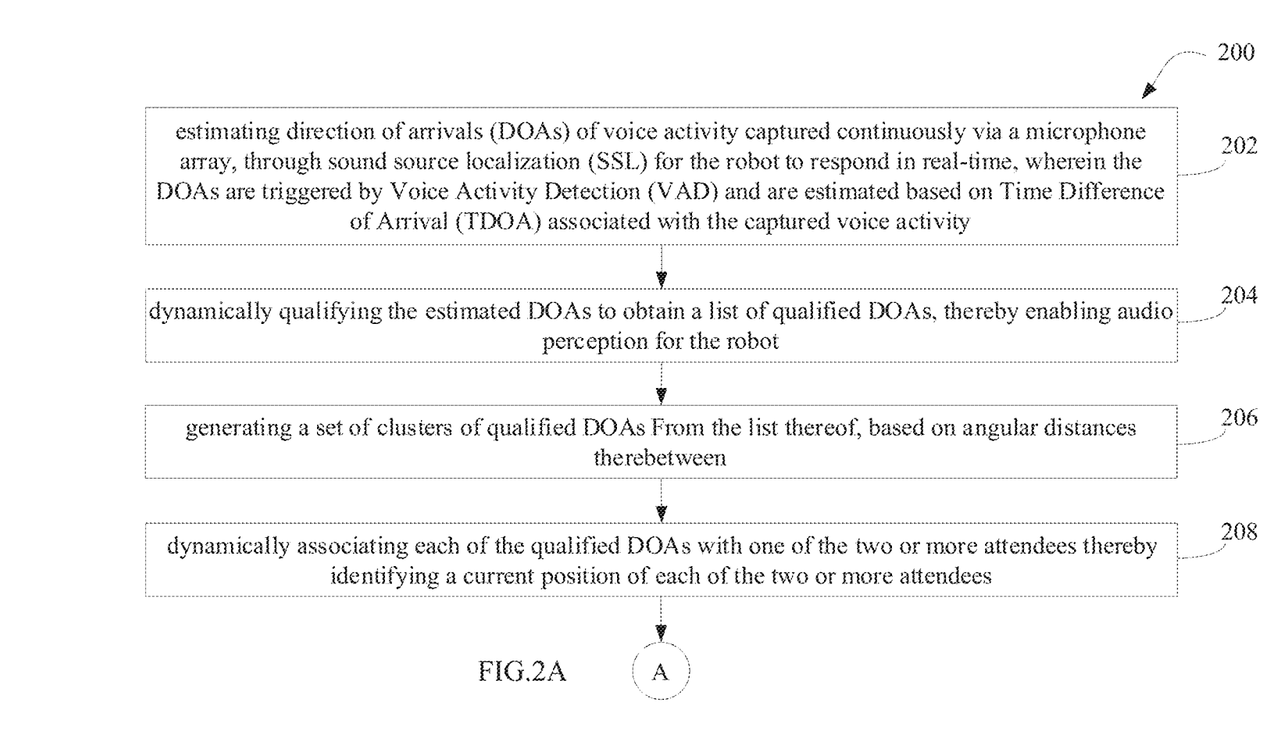
FIG. 2A through FIG. 2B illustrate an exemplary flow diagram of a computer implemented method for attention shifting of a robot in a group conversation using audio-visual perception based speaker localization, in accordance with some embodiments of the present disclosure.
Figure 2B:
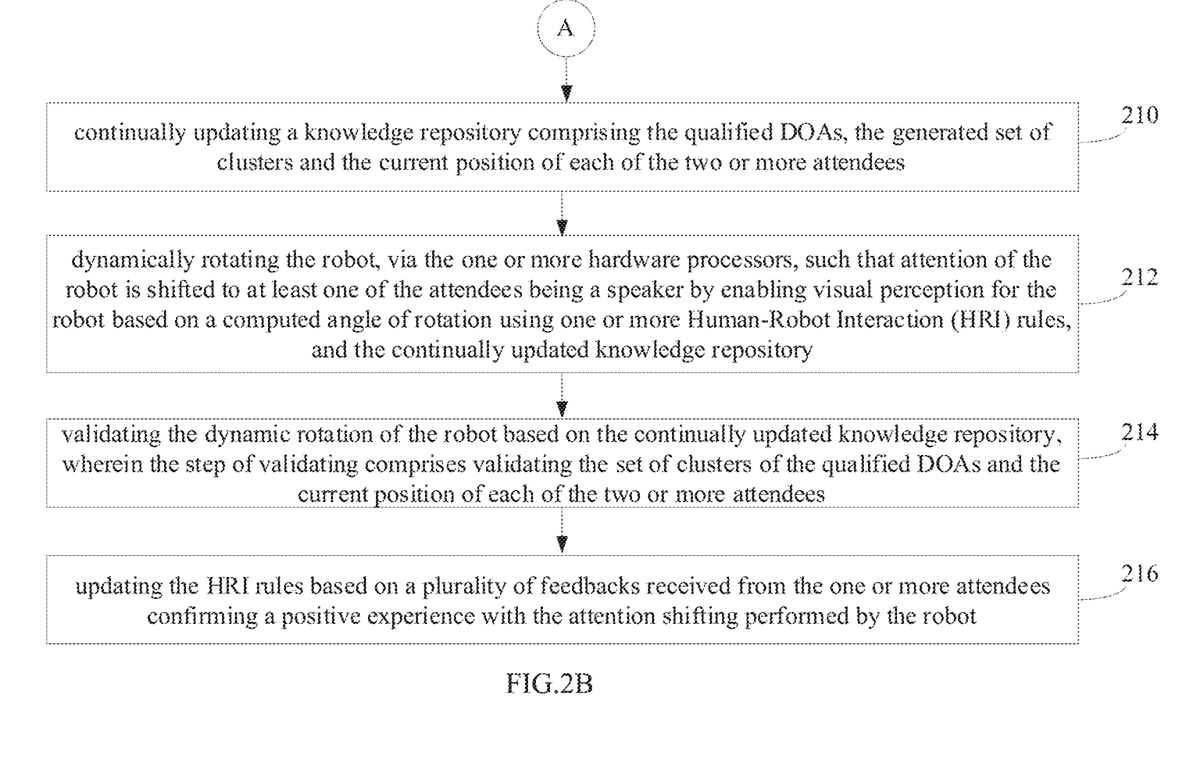

FIG. 2A through FIG. 2B illustrate an exemplary flow diagram of a computer implemented method for attention shifting of a robot in a group conversation using audio-visual perception based speaker localization, in accordance with some embodiments of the present disclosure. In an embodiment, the system 100 includes one or more data storage devices or memory 102 operatively coupled to the one or more processors 104 and is configured to store instructions configured for execution of steps of the method 200 by the one or more processors 104. The steps of the method 200 will now be explained in detail with reference to the components of the system 100 of FIG. 1. Although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

In accordance with an embodiment of the present disclosure, the one or more processors 104 are configured to estimate, at step 202, direction of arrivals (DOAs) of voice activity captured continuously via a microphone array, through sound source localization (SSL). The microphone array is characterized by at least two microphones. If there are n no. of mics, n−1 sound sources may be detected. Accordingly, four mics may be considered optimum from utility and from a standard market availability perspective. In an embodiment, the microphone array is a ReSpeaker 4-Mic array.

In accordance with the present disclosure, the DOAs are triggered by Voice Activity Detection (VAD) and are estimated based on Time Difference of Arrival (TDOA) associated with the captured voice activity. The one or more processors 104 performing VAD, continuously process the microphone array to capture voice activity. Along with the continuous processing, use of SSL facilitates real-time response by the robot. TDOA was chosen because it is computationally cost effective and provides fast DOA estimation in real-time with acceptable accuracy compared to other more accurate methods such as MUltiple Signal Classification (MUSIC). In an embodiment, the step of estimating DOAs of voice activity comprises validating the voice activity captured for estimation of the DOAs based on sampling of the voice activity at an empirically determined frequency (10 samplings per second) until the voice activity is characterized by an empirically determined decibel value for an empirically determined number of continuous samples (8 continuous samples) being a first threshold (referred in the pseudo code later in the description as threshold1). The decibel value may depend on the audio driver of the microphone. An output in the form of 1 or 0 is obtained from the microphone based on the decibel value. For instance, if the empirically determined frequency is say 10 sampling per second, if say an output is obtained for 8 continuous samples, the voice activity may be validated for estimating the DOAs.

In accordance with an embodiment of the present disclosure, the one or more processors 104 are configured to dynamically qualify, at step 204, the estimated DOAs to obtain a list of qualified DOAs, thereby enabling audio perception for the robot. In an embodiment, the one or more processors 104, are configured to generate, at step 204, a set of clusters of qualified DOAs from the list of the qualified DOAs, based on angular distances between the qualified DOAs. In accordance with the present disclosure, qualification of the estimated DOAs is a critical step to overcome a drawback in some of the state of the art, wherein noise capture caused erroneous rotation of the robot resulting in poor interaction experience. Firstly, a difference between a current estimated DOA and a previous estimated DOA is computed. When a first qualified DOA is identified, the current estimated DOA is appended to the list of qualified DOAs and a timeout instant is set, if the computed difference is greater than an empirically determined third threshold (referred in the pseudo code later in the description as threshold3). In an embodiment, the timeout instant is a sum of a current time and an empirically determined second threshold (referred in the pseudo code later in the description as threshold2). For instance, if the current time is 1 am and the empirically determined second threshold is 1 hour, the timeout instant is 2 am. The set of clusters of the qualified DOAs are generated if the list of qualified DOAs is not empty and the current time is greater than the timeout instant; else the voice capturing is continued.

In accordance with an embodiment of the present disclosure, the step of generating a set of clusters of qualified DOAs comprises initially identifying, a first qualified DOA as a first cluster of the set of clusters. Each of the qualified DOAs is then dynamically assigned, in an unsupervised manner, to the first cluster or to a new cluster as part of the set of clusters depending on the angular distance of the qualified DOAs from a center associated with each cluster in the set of clusters. In accordance with the present disclosure, the center is an average DOA associated with the cluster. Each time a qualified DOA is assigned to a cluster, the average DOA associated with each cluster in the set of clusters is updated to obtain a new center to facilitate further assignment of the qualified DOAs to a cluster.

In an embodiment of the present disclosure, a qualified DOA is assigned to a cluster if the angular distance between the qualified DOA and the center of a cluster from the set of clusters is less than an empirically determined fourth threshold and also lesser than the angular distance between the other clusters in the set of clusters. In an embodiment, the fourth threshold is 15°. If the angular distance in this case is within 15°, the qualified DOA may be assigned to an existing cluster; else a new cluster may be initiated. Again, the average DOA associated with each cluster is updated.

In accordance with an embodiment of the present disclosure, the one or more processors 104 are configured to dynamically associate each of the qualified DOAs, at step 208, with one of the two or more attendees, thereby identifying a current position of each of the two or more attendees. Again, the one or more processors 104 are configured to continually update, at step 210, a knowledge repository comprising the qualified DOAs, the generated set of clusters and the current position of each of the two or more attendees. In an embodiment, the knowledge repository is comprised in the one or more data storage devices 102. The knowledge repository is crucial to the intelligence the robot develops and enhances with each interaction.

In accordance with an embodiment of the present disclosure, the one or more processors 104 are configured to dynamically rotate the robot, at step 212, such that attention of the robot is shifted to at least one of the attendees being a speaker by enabling visual perception for the robot based on a computed angle of rotation using one or more Human-Robot Interaction (HRI) rules and the continually updated knowledge repository.

In an embodiment, the step of dynamically rotating the robot such that attention of the robot is shifted to at least one of the attendees comprises firstly computing an initial angle of rotation for the robot based on the audio perception using the qualified DOAs, wherein the robot initiates rotation either towards the center of a cluster to which each of the qualified DOAs belong or towards the qualified DOAs if it is not part of any cluster from the set of clusters and forms a new cluster within the set. Since the cluster generation involves updation of the average DOA after every assignment, the center of the clustered considered for computing the initial angle of rotation is also the updated center.

The audio perception is further complemented by visual perception which involves performing a real time face detection from a continuous video feed via a camera to detect one or more faces associated with the qualified DOAs. In an embodiment, a Quantum QHM495LM 25MP web camera is used and the output is fed to a Haar cascade classifier for face detection. If a face is detected, the robot is further rotated from the initial angle of rotation. The rotation continues until the detected face is in the middle of the viewing area of the robot. The robot adjusts its angle of rotation or viewing angle of the camera until boundary pixels of a box surrounding the detected face is exactly in the middle of the viewing area. In the context of the present disclosure, rotation of the robot may involve rotation of the head of the robot with the camera or the entire body of the robot. Accordingly, any reference to rotation of the robot is understood to imply rotation of the camera or viewing angle of the camera.

In accordance with the present disclosure, if more than one face is detected, lip movement detection is performed to identify a speaker from amongst the detected faces. The robot is then further rotated from the initial angle of rotation such that the identified speaker is in the middle of the viewing area of the robot.

If there are two or more DOAs, the robot tries to minimize rotation and cover both the DOAs. If the speakers associated with the two or more DOAs are not covered in the viewing area, the robot tries to bring the detected face of the speaker into the viewing area, not necessarily in the middle to ensure at least the speaker is in the viewing area at a location that facilitates minimum time for rotation to the other detected face not currently covered by the robot.

Figure 3:
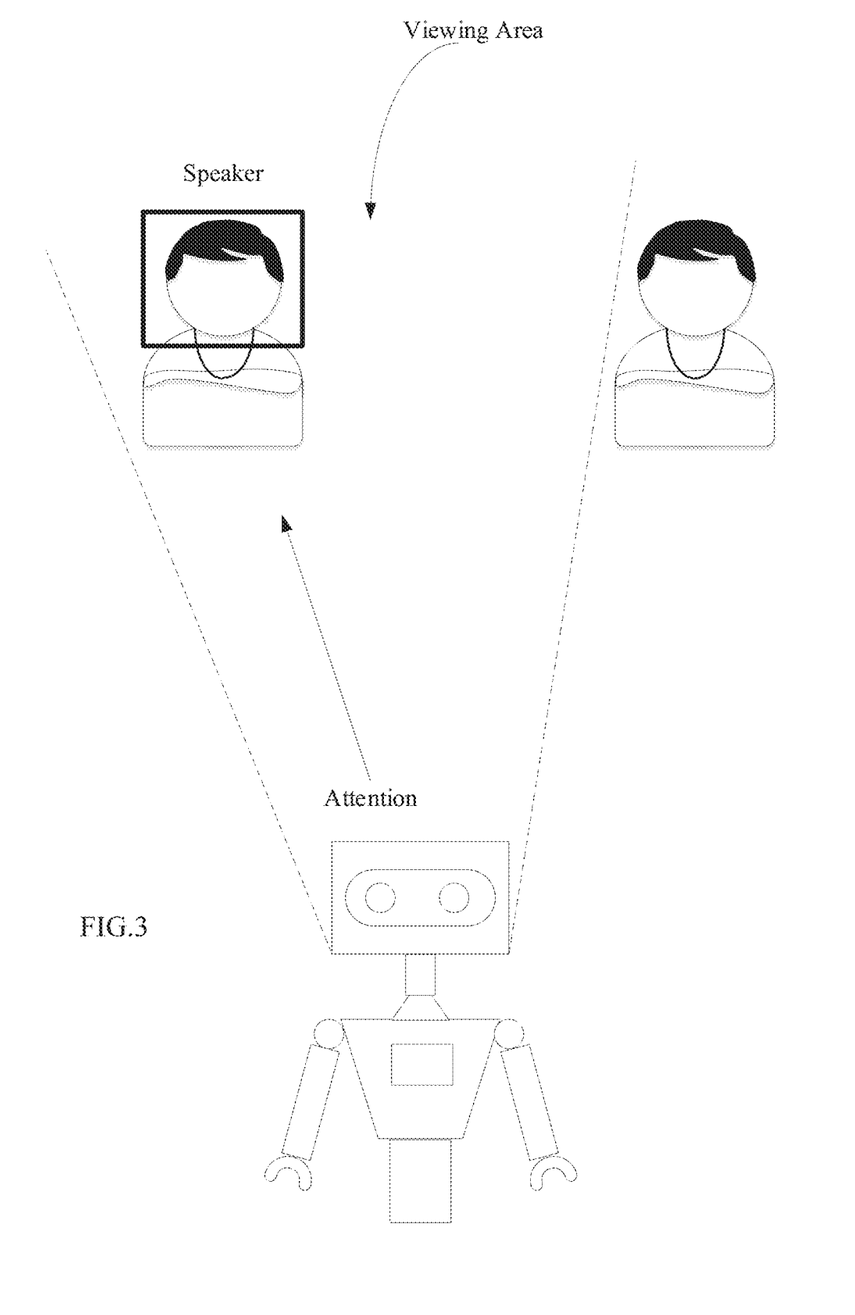
FIG. 3 illustrates an exemplary scenario of attention shifting, in accordance with some embodiments of the present disclosure.
Figure 4:
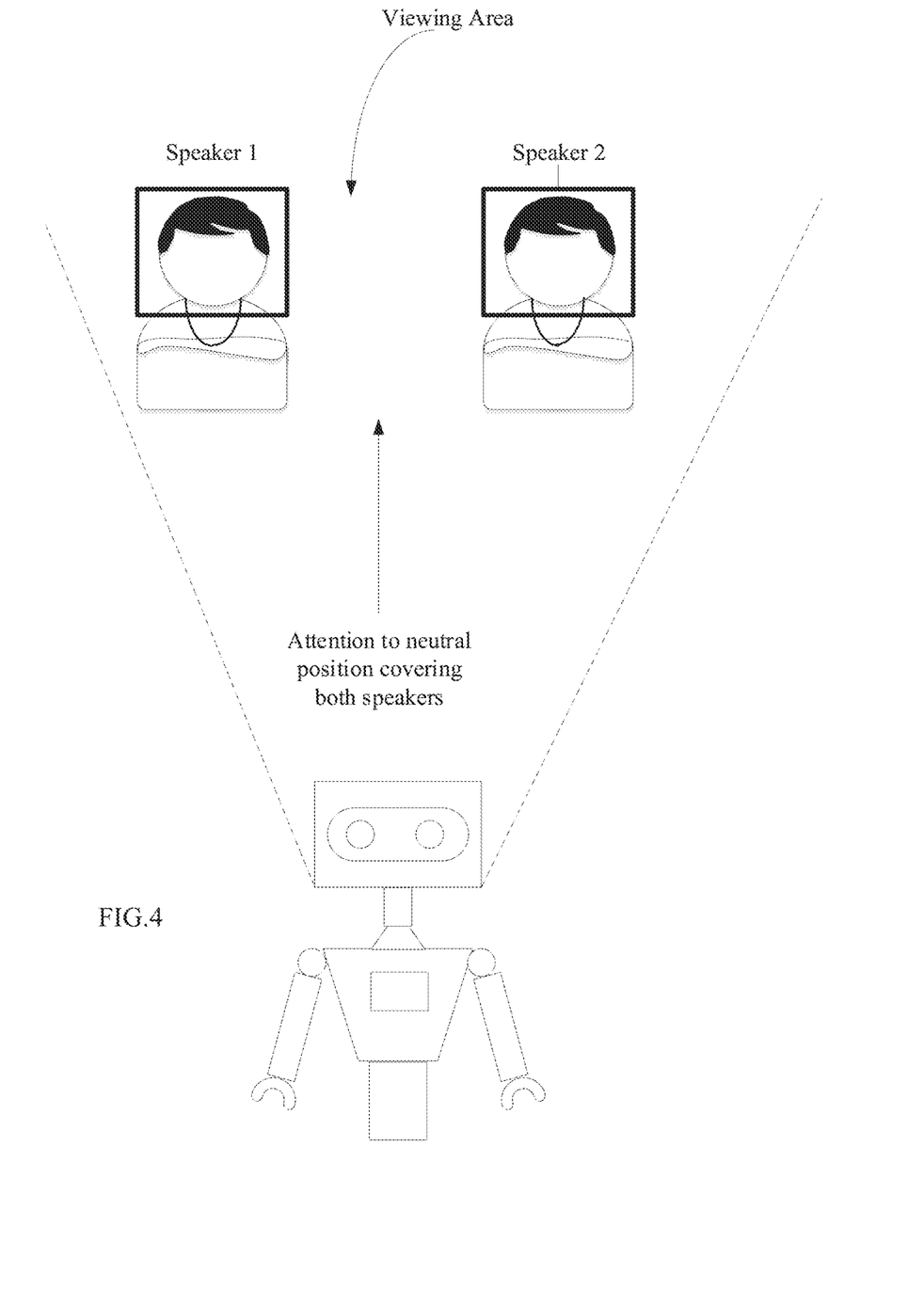
FIG. 4 illustrates another exemplary scenario of attention shifting, in accordance with some embodiments of the present disclosure.
Figure 5:
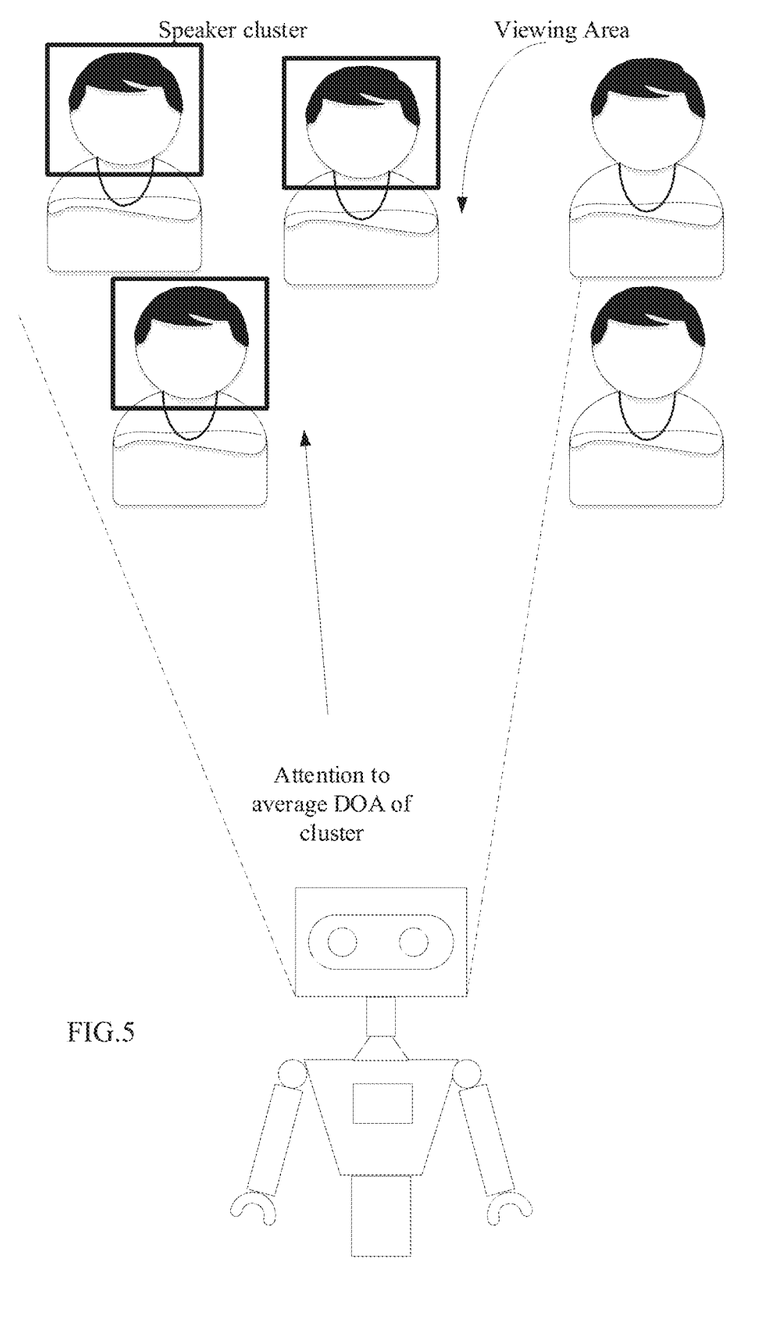
FIG. 5 illustrates yet another exemplary scenario of attention shifting, in accordance with some embodiments of the present disclosure.

In accordance with an embodiment of the present disclosure, the HRI rules may include: 1) rotate only if there is a time interval of more than 2 seconds between two consecutive DOA estimations; 2) rotate to a neutral location if the time interval between two consecutive DOA estimations is less than 2 seconds; 3) rotate only if the angular difference between two consecutive DOA estimations is greater than 5 seconds; and 4) rotate to the average DOA of a particular cluster if the voice activity captured is associated with the particular cluster. However, the HRI rules may be defined to accommodate all practical scenarios such as the scenario mentioned above with respect to the robot being unable to cover all the speakers having qualified DOAs in a single viewing area. FIG. 3 through FIG. 5 illustrate different scenarios of attention shifting, in accordance with some embodiments of the present disclosure. FIG. 3 illustrates a scenario with one speaker and the robot, wherein rule 1 or 3 mentioned above may apply. FIG. 4 illustrates a scenario with two speakers and the robot, wherein rule 2 may apply. FIG. 5 illustrates a scenario with multiple speakers, wherein rule 4 may apply.

In an embodiment, the one or more processors 104 are configured to validate, at step 214, the dynamic rotation of the robot, based on the continually updated knowledge repository, wherein the step of validating comprises validating the set of clusters of the qualified DOAs and the current position of each of the two or more attendees. In an embodiment, the one or more processors 104 are configured, to update, at step 214, the HRI rules based on a plurality of feedbacks received from the one or more attendees confirming a positive experience with the attention shifting performed by the robot. Thus continual updation of the knowledge repository facilitates developing intelligence with each interaction of the robot with humans so that meaningful attention shifting decisions can be taken. In an embodiment, the interaction may then be extended to a plurality of robots with two or more human attendees.

In accordance with an embodiment of the present disclosure, an exemplary pseudo code that describes the procedure for state changes in the state represent model may be as shown below:

```
// initialize
DOA_list = empty_list( );
positive_DOA_timeout = -1;
initialize_sound_clusters( );
// Robot state S0
while True do
    VAD_length = voice_activity_detection(VAD_sample_rate);
//based on decibel value
    if VAD_length > threshold1 then
        DOA_curr = estimate_direction_of_arrival( )
        Break;
    if len(DOA_list) > 0 and current_time( ) > positive_DOA_timeout then
        Break;
go to S1;
// Robot state S1
if |DOA_curr - DOA_prev| > threshold3 then
    DOA_list.append(DOA_curr);
    DOA_prev = DOA_curr
    if len(DOA_list) == 1 then
        positive_DOA_timeout = current_time( ) + threshold2;
if len(DOA_list) > 0 and current_time( ) > positive_DOA_timeout then
    positive_DOA_timeout = -1;
    go to S2;
else
    go to S0;
// Robot state S2
new_cluster_formation = False;
for DOA in DOA_list do
    if part_of_existing_clusters(DOA) is False then
        new_cluster_formation = True;
        break;
if new_cluster_formation is True then
    trigger_cluster_formation(DOA_list)
active_cluster_center_list = get_active_cluster_center( );
rotation_angle = get_center(active_cluster_center_list);
DOA_list = empty_list( );
positive_DOA_timeout
go to S2;
//Robot state S3
while True do
    rotate_robot(rotation_angle);
    [talking_face, visible_speakers] = detect_human_lip_movement( );
    if talking_face is True then
        break;
    else
        if time_out < current_time( ) then
            go to S0;
        else
            rotation_angle = get_nearest_active_cluster_center(
active_cluster_center_list);
all_face_exists = check_knowledge_base(visible_speakers);
if all_face_exists is False then
    add_to_knowledge_base(visible_speakers);
number_of_speaker = speaker_list(time_window);
if number_of_speaker == 1 then
    continue;
else
    all_visible = all_speaker_visible(visible_speakers, recent_speaker_list,
time_window);
    if all_visible is True then
        continue;
    else
        while current_speaker_is_visible( ) then
            rotate_towards_nearest_active_cluster_center(step_size); //
step_size = 5 degree
update_recent_speaker_list(visible_speakers, recent_speaker_list);
go to S0.
```

EXPERIMENTAL OBSERVATIONS AND EVALUATION

An experiment was conducted to evaluate an embodiment of the systems and methods of the present disclosure and analyze the attention shifting performed by the robot.

Evaluation Methodology

Some parameters were defined to evaluate the system and method based on user experience and feedback. Table I below provides the five defined parameters based on which user (collocated attendees and remote attendees) satisfaction ratings with regards to ease of interaction and feeling of belongingness between 1-10 scale were noted.

TABLE I

| Parameters | Description |
| --- | --- |
| Unnecessary turns ($p_1$) | How many unnecessary turns are included in a single interaction session |
| Necessary turns ($p_2$) | How many necessary turns are missed in a single interaction |
| Turn accuracy ($p_3$) | How many times the robot turns to the speaker with unacceptable accuracy |
| Attention accuracy in a group of 2 or more people ($p_4$) | How many times the robot has misjudged the speaking person |
| Speaker detection accuracy ($p_5$) | How many times the robot has missed the entire process of speaker detection and attention shifting |

The final calculated value is referred to as User Experience/Satisfaction Index (UEI). The higher the values of the defined parameters, the higher is the UEI value and the higher the UEI value, the higher is the likability and usability of the system. $p_1$ is high if lower unnecessary turns are included in the interaction. $p_2$ is high if lower necessary turns are missed in the interaction. $p_3$ is high if the robot turns to the actual speaker with lower unacceptable accuracy in the interaction. $p_4$ is high if the robot has misjudged the speaking person lower number of times in the interaction. $p_5$ is high if the robot has missed the entire process of speaker detection lower number of times in the interaction.

UEI is then calculated giving equal weightage to each of the 5 parameters as follows:

$$UEI = \frac{p_1 + p_2 + p_3 + p_4 + p_5}{5} \quad (1)$$

The root was made to interact in two scenarios as described below.

Scenario 1: Robot and two collocated attendees:
The robot was placed in a meeting setup with two collocated attendees in front of it. A remote attendee controlled the robot from a remote machine. The interaction continued for 3 to 6 minutes. The collocated attendees interacted within themselves and the remote attendee through the robot. Feedback was obtained from the collocated attendees. An average UEI of 7 (scale of 1-10) using equation (1) was calculated based on the feedback. Feedback from the remote attendee also resulted in a UEI of 7. Collocated attendees and the remote attendee responded positively on the robots participation in the interaction and the remote attendee's feeling on belongingness in the meeting. The audio-visual perception enabled by the system of the present disclosure was able to perceive the environment and shift attention to the speaking person in an efficient manner.

Scenario 2: Robot and multiple (more than 2) collocated attendees:
The robot was placed in a scenario having more than 2 attendees. Similar positive responses were obtained from the collocated attendees and remote attendees. The system was rated with a UEI of 7 (rounded off). In the case of multiple collocated attendees, the extent of belongingness was not impacted due to the visual perception of the system of the present disclosure. The robot was able to self-adjust without intervention by the remote attendee. The remote attendee felt he was present in the meeting himself. The collocated attendees also felt that the remote person was present in the meeting because of the efficient attention shifting by the robot. A limitation of the test setup for the height of the robot used. An adjustable camera was used to focus and detect faces by ensuring its focus in an upper angle was facilitated to view faces of the collocated attendees.

Systems and methods of the present disclosure thus decide on when to shift attention by addressing qualified voice activity detection to avert spurious rotations by the robot in response to any noise. How much to rotate is decided not merely based on the robot's current pose and DOA, but also based on situation and context defined in the HRI rules and cluster generation employed. For instance, if there are speakers in a nearby region, if the new direction is too much apart from the current pose, the new source may trigger formation of a new sound cluster. An adaptive feature of the method and system of the present disclosure is the dynamic adjustment of the rotation angle. The robot detects a face and then brings the face at the center of its viewing front. However, when there are multiple humans at the scene, the robot may not know how many people (attendees) are there in the scene. Based on updation of the knowledge repository and supported by the HRI rules, the robot brings the speakers within the viewing angle. Lip detection helps to decide who the speakers are if multiple faces are detected in the viewing area. Moreover, the knowledge repository helps remember the past speakers and adjust the viewing angle accordingly even if only one face displays lip movement currently. In case, there are multiple lip movements detected within a short span, the robot considers all of them as speakers and adjusts the viewing angle (rotation) accordingly to keep all the speakers in the view (visual clustering). The knowledge repository provides the needed intelligence for the robot to make dynamic decisions through continual learning. Although a number of empirically determined thresholds have been discussed, it may be noted that these are provided as a one-time input to the system of the present disclosure to ensure quality of experience. Further enriching of the experience and addressing various scenarios are possible without human intervention based on the acquired intelligence. For instance, the robot can deal with single speaker, double speaker, multiple speaker scenarios also where one or more attendees join the interaction. The dynamics of a meeting cannot be always known or pre-configured. Likewise, the speakers may or may not be stationary in a single location when speaking. The methods and systems of the present disclosure are capable of addressing such dynamic requirements on the fly as described above.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for shifting attention of a robot characterized by a state representation model, in a group conversation with two or more attendees with at least one of the two or more attendees being a speaker, the method comprising the steps of: estimating, via one or more hardware processors comprised in the state representation model, direction of arrivals (DOAs) of voice activity captured continuously via a microphone array, through sound source localization (SSL) for the robot to respond in real-time, wherein the DOAs are triggered by Voice Activity Detection (VAD) and are estimated based on Time Difference of Arrival (TDOA) associated with the captured voice activity; dynamically qualifying, via the one or more hardware processors, the estimated DOAs to obtain a list of qualified DOAs, thereby enabling audio perception for the robot; generating, via the one or more hardware processors, a set of clusters of qualified DOAs from the list thereof, based on angular distances therebetween; dynamically associating, via the one or more hardware processors, each of the qualified DOAs with one of the two or more attendees thereby identifying a current position of each of the two or more attendees; continually updating, via the one or more hardware processors, a knowledge repository comprising the qualified DOAs, the generated set of clusters and the current position of each of the two or more attendees; and dynamically rotating the robot, via the one or more hardware processors, such that attention of the robot is shifted to at least one of the attendees being a speaker by enabling visual perception for the robot based on a computed angle of rotation using one or more Human-Robot Interaction (HRI) rules and the continually updated knowledge repository, wherein the step of dynamically qualifying the estimated DOAs to obtain a list of qualified DOAs comprises: computing a difference between a current estimated DOA and a previous estimated DOA; on identifying a first qualified DOA, appending the current estimated DOA to the list of qualified DOAs and setting a timeout instant being a sum of a current time and an empirically determined second threshold, if the computed difference is greater than an empirically determined third threshold; and generating the set of clusters of the qualified DOAs, if the list of qualified DOAs is not empty and the current time is greater than the timeout instant, else continue capturing the voice activity.

2. The processor implemented method of claim 1, wherein the step of estimating DOAs of voice activity comprises validating the voice activity captured for estimation of the DOAs based on sampling of the voice activity at an empirically determined frequency until the voice activity is characterized by an empirically determined decibel value for an empirically determined number of continuous samples being a first threshold.

3. The processor implemented method of claim 1, wherein the step of generating a set of clusters of qualified DOAs comprises: identifying a first qualified DOA as a first cluster of the set of clusters; dynamically assigning each of the qualified DOAs to the first cluster or to a new cluster as part of the set of clusters depending on the angular distance of the qualified DOAs from a center associated with each cluster in the set of clusters, wherein the center is an average DOA of an associated cluster; and updating the average DOA associated with each cluster in the set of clusters after every assignment of the qualified DOAs to a cluster in the set of clusters to generate a new center for each cluster in the set of clusters for further assigning of the qualified DOAs to a cluster.

4. The processor implemented method of claim 3, wherein a qualified DOA is assigned to a cluster if the angular distance between the qualified DOA and the center of a cluster from the set of clusters is less than an empirically determined fourth threshold and also lesser than the angular distance between the other clusters in the set of clusters.

5. The processor implemented method of claim 3, wherein the step of dynamically rotating the robot such that attention of the robot is shifted to at least one of the attendees comprises: computing an initial angle of rotation for the robot based on the audio perception using the qualified DOAs, wherein the robot initiates rotation either towards the center of a cluster to which each of the qualified DOAs belong or towards the qualified DOAs if it is not part of any cluster from the set of clusters and forms a new cluster therewithin; performing real time face detection from a continuous video feed via a camera to detect one or more faces associated with the qualified DOAs; and rotating the robot by performing one of: modifying the initial angle of rotation such that a detected face is in the middle of the viewing area of the robot based on boundary pixels of a box surrounding the detected face, if only one face is detected; and performing lip movement detection to identify a speaker if more than one face is detected and modifying the initial angle of rotation or adjusting viewing angle of the camera such that the detected face of the identified speaker is in the middle of the viewing area of the robot.

6. The processor implemented method of claim 5, wherein the one or more HRI rules comprise: 1) rotate only if there is a time interval of more than 2 seconds between two consecutive DOA estimations; 2) rotate to a neutral location if the time interval between two consecutive DOA estimations is less than 2 seconds; 3) rotate only if the angular difference between two consecutive DOA estimations is greater than 5 seconds; and 4) rotate to the average DOA of a particular cluster if the voice activity captured is associated with the particular cluster.

7. The processor implemented method of claim 1 further comprising: validating, via the one or more hardware processors, the dynamic rotation of the robot based on the continually updated knowledge repository, wherein the step of validating comprises validating the set of clusters of the qualified DOAs and the current position of each of the two or more attendees; and updating, via the one or more hardware processors, the one or more HRI rules based on a plurality of feedbacks received from the one or more attendees confirming a positive experience with the attention shifting performed by the robot.

8. A system for shifting attention of a robot in a group conversation with two or more attendees with at least one of the two or more attendees being a speaker, the system being characterized by a state representation model comprising:
one or more data storage devices operatively coupled to one or more hardware processors and configured to store instructions configured for execution via the one or more hardware processors to: estimate direction of arrivals (DOAs) of voice activity captured continuously via a microphone array characterized by at least 2 microphones, through sound source localization (SSL) for the robot to respond in real-time, wherein the DOAs are triggered by Voice Activity Detection (VAD) and are estimated based on Time Difference of Arrival (TDOA) associated with the captured voice activity; dynamically qualify the estimated DOAs to obtain a list of qualified DOAs, thereby enabling audio perception for the robot; generate a set of clusters of qualified DOAs from the list thereof, based on angular distances therebetween; dynamically associate each of the qualified DOAs with one of the two or more attendees thereby identifying a current position of each of the two or more attendees; continually update a knowledge repository comprising the qualified DOAs, the generated set of clusters and the current position of each of the two or more attendees; and dynamically rotate the robot such that attention of the robot is shifted to at least one of the attendees being a speaker by enabling visual perception for the robot based on a computed angle of rotation using one or more Human-Robot Interaction (HRI) rules and the continually updated knowledge repository, wherein the one or more processors are further configured to dynamically qualify the estimated DOAs to obtain a list of qualified DOAs by: computing a difference between a current estimated DOA and a previous estimated DOA; on identifying a first qualified DOA, appending the current estimated DOA to the list of qualified DOAs and setting a timeout instant being a sum of a current time and an empirically determined second threshold, if the computed difference is greater than an empirically determined third threshold; and generating the set of clusters of the qualified DOAs, if the list of qualified DOAs is not empty and the current time is greater than the timeout instant, else continue capturing the voice activity.

9. The system of claim 8, wherein the one or more processors are further configured to estimate DOAs of voice activity by validating the voice activity captured for estimation of the DOAs based on sampling of the voice activity at an empirically determined frequency until the voice activity is characterized by an empirically determined decibel value for an empirically determined number of continuous samples being a first threshold.

10. The system of claim 8, wherein the one or more processors are further configured to generate a set of clusters of qualified DOAs by: identifying a first qualified DOA as a first cluster of the set of clusters; dynamically assigning each of the qualified DOAs to the first cluster or to a new cluster as part of the set of clusters depending on the angular distance of the qualified DOAs from a center associated with each cluster in the set of clusters, wherein the center is an average DOA of an associated cluster; and updating the average DOA associated with each cluster in the set of clusters after every assignment of the qualified DOAs to a cluster in the set of clusters to generate a new center for each cluster in the set of clusters for further assigning of the qualified DOAs to a cluster.

11. The system of claim 10, wherein the one or more processors are further configured to assign an estimated DOA to a cluster if the angular distance between the estimated DOA and the center of a cluster from the set of clusters is less than an empirically determined fourth threshold and also lesser than the angular distance between the other clusters in the set of clusters.

12. The system of claim 10, wherein the one or more processors are further configured to dynamically rotate the robot such that attention of the robot is shifted to at least one of the attendees by: computing an initial angle of rotation for the robot based on the audio perception using the qualified DOAs, wherein the robot initiates rotation either towards the center of a cluster to which each of the qualified DOAs belong or towards the qualified DOAs if it is not part of any cluster from the set of clusters and forms a new cluster therewithin; performing real time face detection from a continuous video feed via a camera to detect one or more faces associated with the qualified DOAs; and rotating the robot by performing one of: modifying the initial angle of rotation such that a detected face is in the middle of the viewing area of the robot based on boundary pixels of a box surrounding the detected face, if only one face is detected; and performing lip movement detection to identify a speaker if more than one face is detected and modifying the initial angle of rotation or adjusting viewing angle of the camera such that the detected face of the identified speaker is in the middle of the viewing area of the robot.

13. The system of claim 12, wherein the one or more HRI rules comprise: 1) rotate only if there is a time interval of more than 2 seconds between two consecutive DOA estimations; 2) rotate to a neutral location if the time interval between two consecutive DOA estimations is less than 2 seconds; 3) rotate only if the angular difference between two consecutive DOA estimations is greater than 5 seconds; and 4) rotate to the average DOA of a particular cluster if the voice activity captured is associated with the particular cluster.

14. The system of claim 8, wherein the one or more processors are further configured to: validate the dynamic rotation of the robot based on the continually updated knowledge repository by validating the set of clusters of the qualified DOAs and the current position of each of the two or more attendees; and update the one or more HRI rules based on a plurality of feedbacks received from the one or more attendees confirming a positive experience with the attention shifting performed by the robot.

15. A computer program product comprising a non-transitory computer readable medium having a computer readable program embodied therein, wherein the computer readable program, when executed on a computing device, causes the computing device to: estimate, via one or more hardware processors comprised in a state representation model, direction of arrivals (DOAs) of voice activity captured continuously via a microphone array characterized by at least 2 microphones, through sound source localization (SSL) for the robot to respond in real-time, wherein the DOAs are triggered by Voice Activity Detection (VAD) and are estimated based on Time Difference of Arrival (TDOA) associated with the captured voice activity; dynamically qualify, via the one or more hardware processors, the estimated DOAs to obtain a list of qualified DOAs, thereby enabling audio perception for the robot; generate, via the one or more hardware processors, a set of clusters of qualified DOAs from the list thereof, based on angular distances therebetween; dynamically associate, via the one or more hardware processors, each of the qualified DOAs with one of the two or more attendees thereby identifying a current position of each of the two or more attendees; continually update, via the one or more hardware processors, a knowledge repository comprising the qualified DOAs, the generated set of clusters and the current position of each of the two or more attendees; and dynamically rotate the robot, via the one or more hardware processors, such that attention of the robot is shifted to at least one of the attendees being a speaker by enabling visual perception for the robot based on a computed angle of rotation using one or more Human-Robot Interaction (HRI) rules and the continually updated knowledge repository, wherein the step of dynamically qualifying the estimated DOAs to obtain a list of qualified DOAs comprises: computing a difference between a current estimated DOA and a previous estimated DOA; on identifying a first qualified DOA, appending the current estimated DOA to the list of qualified DOAs and setting a timeout instant being a sum of a current time and an empirically determined second threshold, if the computed difference is greater than an empirically determined third threshold; and generating the set of clusters of the qualified DOAs, if the list of qualified DOAs is not empty and the current time is greater than the timeout instant, else continue capturing the voice activity.

16. The computer program product of claim 15, wherein the computer readable program further causes the computing device to: validate, via the one or more hardware processors, the dynamic rotation of the robot based on the continually updated knowledge repository by validating the set of clusters of the qualified DOAs and the current position of each of the two or more attendees; and update, via the one or more hardware processors, the one or more HRI rules based on a plurality of feedbacks received from the one or more attendees confirming a positive experience with the attention shifting performed by the robot.

* * * * *